(12) United States Patent
Kling

(10) Patent No.: US 6,597,852 B2
(45) Date of Patent: Jul. 22, 2003

(54) CONTROLLING BIREFRINGENCE IN AN OPTICAL WAVEGUIDE

(75) Inventor: Laurent Kling, Oxford (GB)

(73) Assignee: Bookham Technology plc, Oxfordshire (GB)

( * ) Notice: Subject to any disclaimer, the term of this patent is extended or adjusted under 35 U.S.C. 154(b) by 10 days.

(21) Appl. No.: 09/736,180

(22) Filed: Dec. 15, 2000

(65) Prior Publication Data

US 2001/0024559 A1 Sep. 27, 2001

(30) Foreign Application Priority Data

Dec. 15, 1999 (GB) ............................................. 9929666

(51) Int. Cl.[7] ................................................ G02B 6/10
(52) U.S. Cl. ........................ 385/132; 385/130; 385/144
(58) Field of Search ................................ 385/129–132, 385/141, 144; 65/386, 423, 430

(56) References Cited

U.S. PATENT DOCUMENTS

| | | | |
|---|---|---|---|
| 5,222,095 A | | 6/1993 | Zediker et al. |
| 5,341,444 A | * | 8/1994 | Henry et al. .................. 385/11 |
| 5,354,709 A | * | 10/1994 | Lorenzo et al. ................ 117/8 |
| 5,625,637 A | | 4/1997 | Mori et al. |
| 5,862,168 A | | 1/1999 | Schilling et al. |
| 6,231,771 B1 | * | 5/2001 | Drake .......................... 216/24 |

FOREIGN PATENT DOCUMENTS

| | | |
|---|---|---|
| GB | 2344933 | 6/2000 |
| WO | WO 95/08787 | 3/1995 |

OTHER PUBLICATIONS

Lee et al.; US 2002/0021879 A1; Gradex Index Waveguide; Feb. 21, 2002.*
Wörhoff et al.; Design, Tolerance Analysis, and Fabrication of Silicon Oxynitride Based Planar Optical Waveguides for Communication Devices; Aug. 1999; Journal of Lightwave Technology; vol. 17, No. 8; pp. 1401–1403.*
I.R. Johnston et al. "Silicon–based fabrication process for production of optical waveguides" IEE Proc. Optoelectronics 143(1), Feb. 1996, pp. 37–40.
"Process And Structure For Optical Waveguide Elements Embedded In Silicon"; IBM Technical Disclosure Bulletin, vol. 33, No. 6B; Nov. 1990, pp. 124–125.
J. Margail et al.; "Reduced Defect Density In Silicon–On–Insulator Structures Formed By Oxygen Implantation In Two Steps"; Appl. Phys. Lett., vol. 54, No. 6; Feb. 6, 1989; pp. 526–528.

* cited by examiner

*Primary Examiner*—Hemang Sanghavi
*Assistant Examiner*—Omar Rojas
(74) *Attorney, Agent, or Firm*—Sughrue Mion, PLLC

(57) ABSTRACT

A method of controlling birefringence in a rib waveguide structure manufactured in silicon is describes. The rib waveguide structure comprises an elongated rib element having an upper face and two side faces. According to the method, a blanket layer of silicon nitride is formed to a predetermined thickness over the rib waveguide structure directly abutting the upper face and side faces. The thickness of the blanket layer is selected to control birefringence. A silicon rib waveguide structure incorporating such a layer and a evanescent coupler structure are also described.

32 Claims, 3 Drawing Sheets

CONTROLLING BIREFRINGENCE IN AN OPTICAL WAVEGUIDE

BACKGROUND OF THE INVENTION

1. Field of the Invention

The present invention relates to controlling birefringence in an optical waveguide, and in particular in a silicon rib waveguide structure.

2. Description of the Related Art

As is well known, birefringence represents a significant problem in optical waveguides. Birefringence can result from a number of different sources each of which cause light polarised in a different manner to be subjected to different refractive indices. This results in light of different polarisations being transmitted differently by the waveguide with the result that the behaviour of a device receiving light with a random polarisation, and in particular transmission losses, become unpredictable. Some well known sources of birefringence are the crystalline structure of waveguides, the shape of the waveguide (in terms of its light guiding cross section), and stress and strain induced as a result of any bends, substrate discontinuations etc. in the path of the waveguide.

Rib waveguide structures manufactured on a silicon on insulator chip are known. One such arrangement is described for example in PCT Patent Specification No. WO95/08787. This form of waveguide provides a single mode, low loss (typically less than 0.2 dB/cm for the wavelength range 1.2 to 1.6 microns) waveguide typically having dimensions in the order of 3 to 5 microns which can be coupled to optical fibres and which is compatible with other integrated components. This form of waveguide can also be easily fabricated from conventional silicon-on-insulator wafers (as described in WO95/08787 referred to above) and so is relatively inexpensive to manufacture. That waveguide already exhibits lower birefringence than some other waveguide structures used in integrated optics, such as LiNbO$_3$. Nevertheless, it is an aim of the invention to further reduce or remove birefringence in structures of this type.

SUMMARY OF THE INVENTION

According to one aspect of the present invention there is provided a method of controlling birefringence in a rib waveguide structure manufactured in silicon, the rib waveguide structure comprising an elongated rib element having an upper face and two side faces, the method comprising: forming a blanket layer of silicon nitride to a predetermined thickness over said rib waveguide structure directly abutting said upper face and side faces.

Preferably, the blanket layer of silicon nitride extends over the substrate flanks on either side of the rib waveguide structure.

Another aspect of the invention provides a method of controlling birefringence in a rib waveguide structure manufactured in silicon, the rib waveguide structure comprising an elongated rib element having an upper face and two side faces, the method comprising: growing a layer of oxide over the upper face and side faces; stripping the oxide layer to reveal the upper face and side faces; and forming a layer of silicon nitride to a predetermined thickness over said rib waveguide structure directly abutting said upper face and side faces.

Another aspect of the present invention provides use of a layer of silicon nitride in a method of fabricating a rib waveguide structure in silicon to control birefringence by depositing said layer to a predetermined thickness over said rib waveguide structure.

Still further aspects of the present invention provide a method of manufacturing a silicon rib waveguide structure comprising: forming an elongated rib element in a silicon substrate, the elongated rib element having an upper face and two side faces; and forming a layer of silicon nitride to a predetermined thickness over said elongated rib element directly abutting said upper face and side faces, the predetermined thickness being selected such as to control birefringence in the rib waveguide structure.

A still further aspect of the invention provides a method of manufacturing a silicon rib waveguide structure, the method comprising: forming an elongated rib element having an upper face and two side faces in a silicon substrate; growing a layer of oxide over the upper face and side faces; stripping the oxide layer to reveal the upper face and side faces; and forming a layer of silicon nitride to a predetermined thickness over said rib waveguide structure directly abutting said upper face and side faces.

A yet further aspect of the invention provides a silicon rib waveguide structure comprising an elongated rib element having an upper face and two side faces formed of silicon and a layer of silicon nitride directly abutting said upper face and side faces and having a predetermined thickness selected to control birefringence in the silicon rib waveguide structure.

A yet further aspect of the invention provides an evanescent coupler structure comprising first and second silicon rib waveguides each comprising an elongated rib element having an upper face and two side faces formed of silicon and a layer of silicon nitride directly abutting said upper face and side faces and having a predetermined thickness selected to control birefringence in the evanescent coupler.

It has been determined that for a 4 micron rib waveguide, the optimum thickness of the silicon nitride layer is 1000 A.

For a better understanding of the present invention and to show how the same may be carried into effect, reference will now be made by way of example to the accompanying drawings in which:

DETAILED DESCRIPTION OF THE INVENTION

Figure 1:
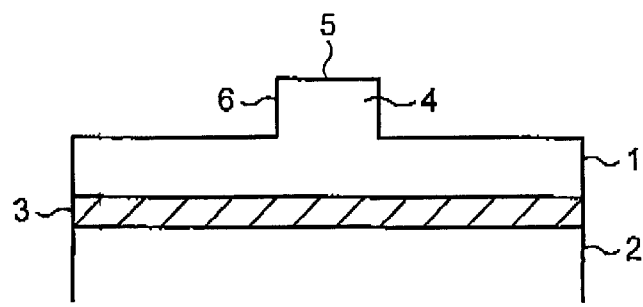
FIGS. 1 to 3 illustrate steps in manufacturing methods of a rib waveguide structure.

A method of making a silicon rib waveguide structure in accordance with a preferred embodiment of the invention is described. The waveguide structure described herein is based on a silicon-on-insulator chip. A process for forming this type of chip is described in a paper entitled "Reduced defect density in silicon-on-insulator structures formed by oxygen implantation in two steps" by J. Morgail et al, Appl. Phys. Lett., 54, p526, 1989. This describes a process for making a silicon-on-insulator wafer. The silicon layer of such a wafer is then increased, for example by epitaxial growth, to make it suitable for forming the basis of the integrated waveguide structure described herein. FIG. 1 shows a cross section through such a silicon-on-insulator wafer in which an elongated rib element has been formed. The wafer or chip comprises a layer of silicon 1 which is separated from silicon substrate 2 by a layer of silicon dioxide 3. The elongated rib element 4 is formed in the silicon layer 1 by etching.

Dimensions of the elongated rib element are in the order of 3 to 5 microns. In one embodiment, the width of its upper face 5 is 4 microns and the depth of each of its two side faces 6 is 1.45 microns.

Figure 2:
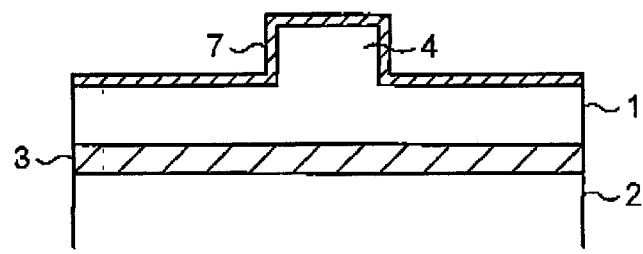

In the subsequent processing step, a layer of oxide is formed by thermal growth to a thickness of around 4000 A. This layer is denoted 7 in FIG. 2. In FIG. 2 like numerals denote like parts as in FIG. 1.

Subsequently an HF etch is carried out to remove the oxide layer 7 and leave bare the upper face 5 and side faces 6 of the elongated rib element 4. Then a layer of silicon nitride (8 in FIG. 3) is deposited using a low pressure chemical vapour deposition (LPCVD) process. In the preferred embodiment, it is deposited to a thickness of 1000 A. As all of the oxide layer 7 was removed in the HF etch following the step illustrated in FIG. 2, the silicon nitride layer 8 directly abuts the upper face and side surfaces 6 of the elongated rib element. The silicon nitride layer is deposited as a blanket layer over the whole waveguide structure. FIG. 4 illustrates the finished product.

According to another embodiment, the intermediate step of growing a layer of oxide and stripping it is omitted.

According to this embodiment, a layer of silicon nitride is deposited directly on the etched elongated rib element structure shown in FIG. 1. That is, the method steps pass from FIG. 1 to FIG. 3 without the intermediate steps described with reference to FIG. 2.

The finished structure is the same according to both embodiments as illustrated in FIG. 4. That is, a layer of silicon nitride is left in the finished structure directly abutting the upper face and side faces 5,6 of the elongated rib element 4. It has been found by the inventors that this significantly reduces the birefringence of the waveguide structure. It is a well known problem in guiding optical waves that birefringent materials demonstrate a different refractive index for different light polarisations. In waveguide structures where it is difficult or impossible to control the polarity of the guided light, this can present a significant problem and in particular is the cause of significant losses. The use of a silicon nitride layer has been found to substantially reduce or practically eliminate birefringence of a rib waveguide structure as described herein. For a waveguide structure having a width of 4 microns, a thickness of 1000 A of silicon nitride has been found to be the optimum thickness.

It is thought that using the intermediate step of growing a silicon oxide layer and then removing it contributes to the reduction of birefringence. Nevertheless a significant improvement has been noted in reduction of birefringence even without that intermediate step.

Figure 5:
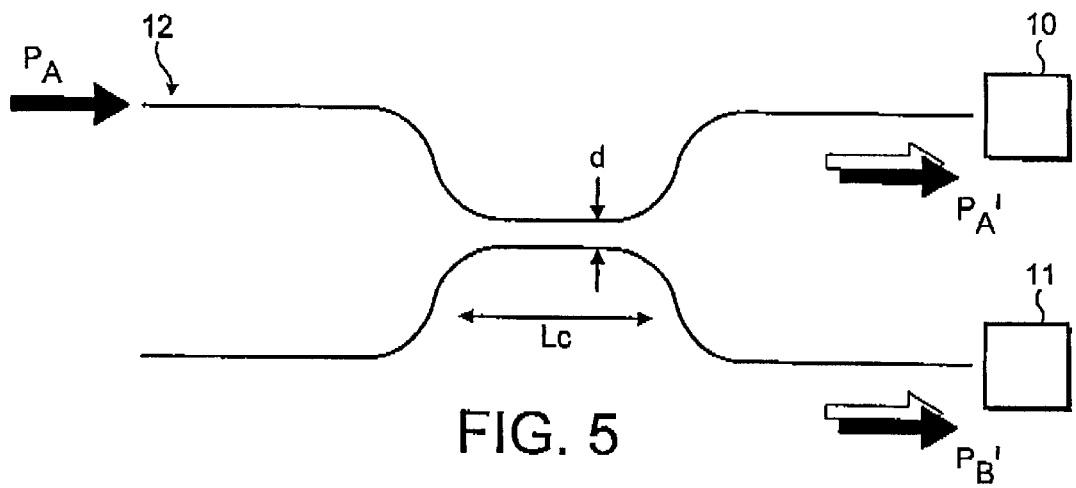
FIG. 5 is a diagram of an evanescent coupler.

In order to demonstrate this improvement, experiments were carried out using evanescent couplers. A diagram of an evanescent coupler is illustrated in FIG. 5. It comprises two waveguides each having the structure illustrated in FIG. 3 spaced apart at the entrance and exits and coming near each other in a central coupling portion labelled $L_c$ without actually touching. $L_c$ in fact denotes the length of the coupling portion. First and second detectors 10,11 are placed at the outputs of the evanescent coupler to detect light output along the respective waveguides of the evanescent coupler. Light is input at one end 12 of one of the waveguides of the coupler and with a symmetrical coupling arrangement it is expected that 50% of the light will be detected by the detector 10 and 50% of the light will be detected by the detector 11. However, any coupler is inevitably subject to some losses and asymmetry. What is important however is to make sure that, as far as possible, the losses in asymmetry affect different polarities of light in the same manner. In particular, two polarities are defined at 90° to one another, transverse electric (TE) and transverse magnetic (TM). In the experiments outlined below to demonstrate the dramatic result in birefringence which occurs using the above described embodiments, light at the second detector 11 was detected in both the TE and TM polarisations.

Details of the experimental method are given below.

Experimental Method

An evanescent coupler of the type illustrated in FIG. 5 was implemented using 4 micron waveguides. A number of different couplers were manufactured on each chip with different coupling lengths $L_c$. The distance d between the waveguides along the coupling length was 6 microns centre to centre. The bends had a 20 mm radius. A Fabry-Perot dual source laser was used to provide infrared light at a wavelength of 1550 nm. The light was introduced at the input end 12 of one of the fibres. That light is labelled $P_A$ in FIG. 5. The polarisation of the light was controlled using bulk optic waveplates. Each detection device 10,11 was provided by a lens which collected the output light, focused it onto a power meter with an infrared camera being used to monitor the light. The polarisation state (TE or TM) of injected light was adjusted before each measurement.

For the first experiment, measurements were carried out on four different structures labelled A, D, E and G. These structures were formed according to the following.

Structure A

This is the structure of FIG. 1, that is where an elongated rib waveguide element has been etched into silicon.

Structure D

This is a structure according to FIG. 2, where an oxide layer 7 of 4000 A has been grown over the elongated rib waveguide element 4.

Structure E

This structure is not shown in the Figures. It is provided by the structure of FIG. 2 onto which an additional layer of silicon nitride to a thickness of 1000 A has been deposited.

Structure G

Figure 3:
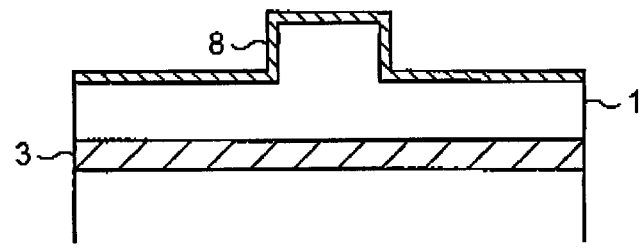
Figure 4:
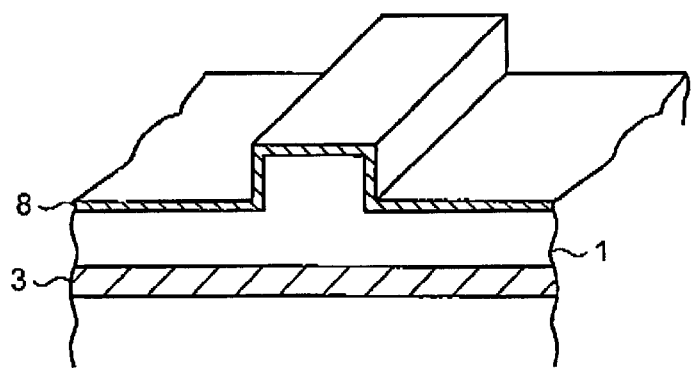
FIG. 4 illustrates an improved non-birefringent structure.

This is a structure according to FIG. 3 where the thickness of the silicon nitride layer is 1000 A. The structure was formed using the process steps of the first embodiment of the invention.

Figure 6:
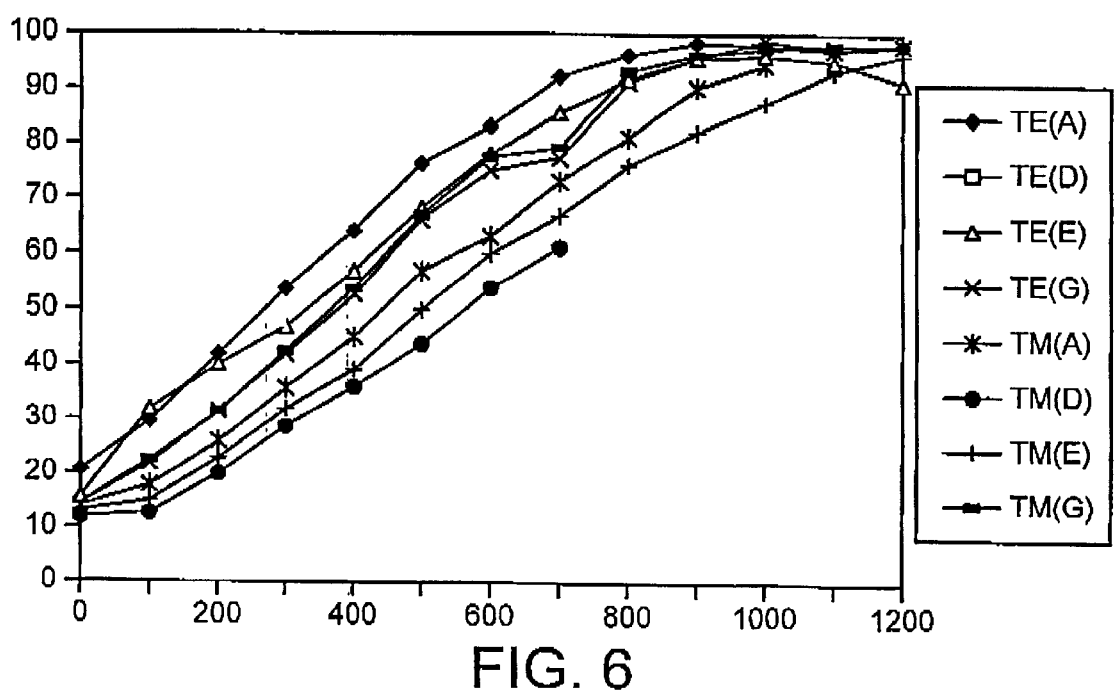
FIG. 6 is a graph of split ratio v. coupling length for different manufacturing techniques.

FIG. 6 is a graph illustrating the relationship between split ratio on the vertical axis and coupling length in microns on the horizontal axis. Split ratio SR is defined in the following:

$$SR(\%)=P_A'/(P_A'+P_B')\times 100$$

FIG. 6 clearly illustrates that the structure which is least polarisation dependent is structure G. where the graphs for TE and TM light are practically convergent for a wide range of coupling lengths.

A second experiment was carried out to find out the effect of thickness of the nitride layer on the split ratio. In addition to structure G already identified above, the following structures C, F and H were used in the experiment resulting in the graph of FIG. 7.

Structure C

Structure C was manufactured in accordance with the second embodiment of the invention, that is by the deposition of a silicon nitride layer on the structure of FIG. 1. The thickness of the silicon nitride layer was 1000 A.

Structure F

Structure F was manufactured in accordance with the first embodiment of the invention but with a thickness of the silicon nitride layer of 500 A.

Structure H

Structure H was manufactured in accordance with the third embodiment of the invention but with a thickness of the silicon nitride layer of 1600 A.

Figure 7:
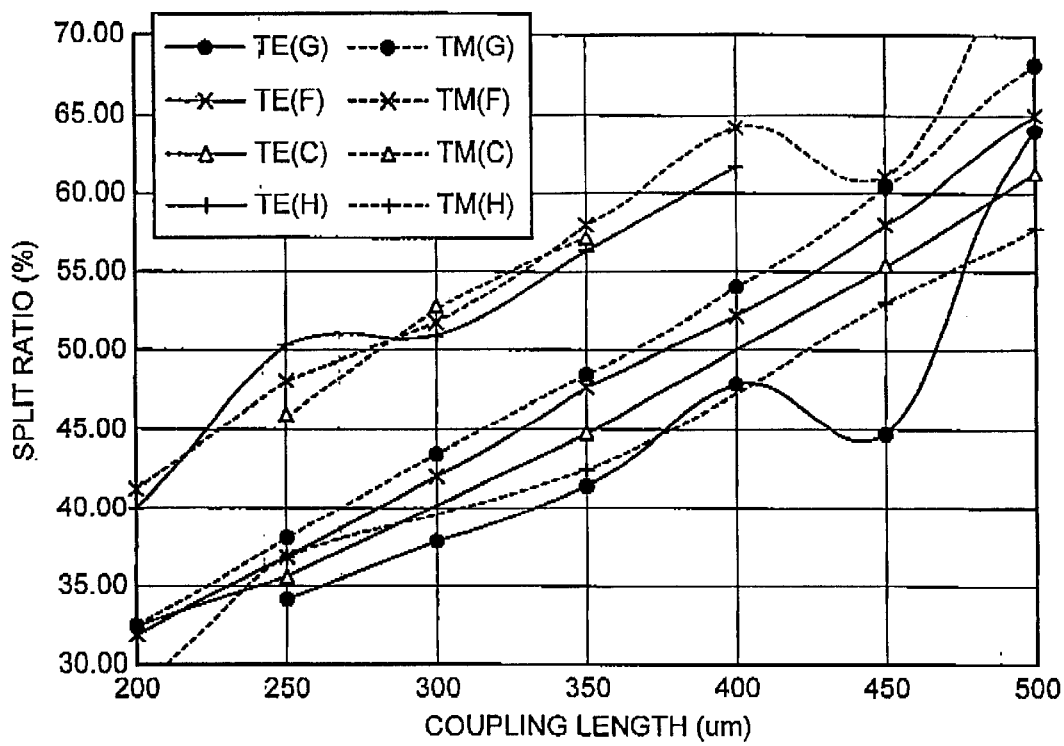
FIG. 7 is a graph of split ratio v. coupling length for different thicknesses of silicon nitride.

From FIG. 7 it can be seen that a thickness of about 1000 A is the optimum thickness for a 4 micron waveguide. It can also be seen that although the best improvement is given in structure G, the structure C also exhibits a good reduction in birefringence.

Figure 8:
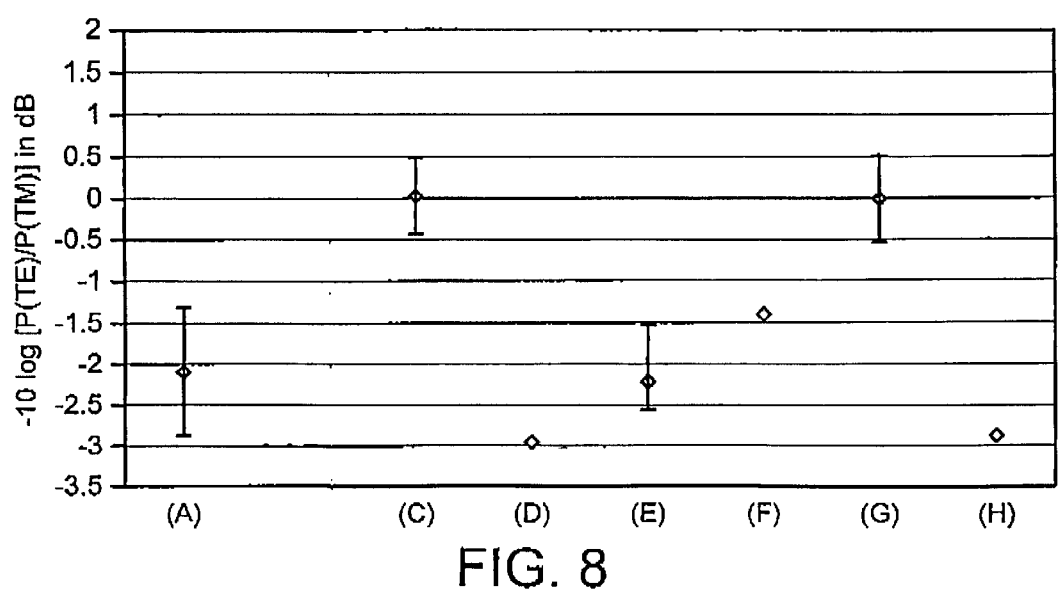
FIG. 8 is a plot of polarisation dependent loss for different structures.

In a third experiment, the polarisation dependent loss was measured for each structure. The polarisation dependent loss (PDL) is defined as a difference in dB between the maximum and the minimum transmission assuming all the states of polarisation have been scanned. The results are illustrated in FIG. 8, where it can be seen that there is a significant improvement in the PDL by the deposition of 1000 A of silicon nitride. In fact, the improvement is similar for structures C and G. That is, the improvement is exhibited regardless of the method of manufacture which is used.

What is claimed is:

1. A method of controlling birefringence in a rib waveguicle structure manufactured in silicon, the rib waveguide structure comprising an elongated silicon rib element having an upper silicon face and two side silicon faces, the method comprising:

forming a blanket layer of silicon nitride to a predetermined thickness over said rib waveguide structure directly abutting said upper silicon face and side silicon faces.

2. A method according to claim 1, wherein the blanket layer of silicon nitride extends over the substrate flanks on either side of the rib waveguide structure.

3. A method of controlling birefringence in a rib waveguide structure manufactured in silicon, the rib waveguide structure comprising an elongated silicon rib element having an upper silicon face and two side silicon faces, the method comprising:

growing a layer of oxide over the upper silicon face and side silicon faces;

stripping the oxide layer to reveal the upper silicon face and side silicon faces; and forming a layer of silicon nitride to a predetermined thickness over said rib waveguide structure directly abutting said upper silicon face and side silicon faces.

4. Use of a layer of silicon nitride in a method of fabricating a rib waveguide structure including an elongated silicon rib element to control birefringence by depositing said layer to a predetermined thickness directly on said elongated silicon rib element.

5. A method of manufacturing a silicon rib waveguide structure comprising:

forming an elongated silicon rib element in a silicon substrate, the elongated rib element having an upper silicon face and two side silicon faces; and forming a layer of silicon nitride to a predetermined thickness over said elongated silicon rib element directly abutting said upper silicon face and side silicon faces, the predetermined thickness being selected such as to control birefringence in the rib waveguide structure.

6. A method of manufacturing a silicon rib waveguide structure, the method comprising:

forming an elongated rib element having an upper silicon face and two side silicon faces in a silicon substrate;

growing a layer of oxide over the upper silicon face and side silicon faces;

stripping the oxide layer to reveal the upper silicon face and side silicon faces; and forming a layer of silicon nitride to a predetermined thickness over said rib waveguide structure directly abutting said upper silicon face and side silicon faces.

7. A silicon rib waveguide structure comprising an elongated silicon rib element having an upper silicon face and two side silicon faces and a layer of silicon nitride directly abutting said upper silicon face and side silicon faces and having a predetermined thickness selected to control birefringence in the silicon rib waveguide structure.

8. A method according to claim 1, wherein the predetermined thickness of the layer of silicon nitride is 1000A for a waveguide structure having a width of 3–5 microns.

9. A method according to claim 2, wherein the predetermined thickness of the layer of silicon nitride is 1000A for a waveguide structure having a width of 3–5 microns.

10. A method according to claim 3, wherein the predetermined thickness of the layer of silicon nitride is 1000A for a waveguide structure having a width of 3–5 microns.

11. A use according to claim 4, wherein the predetermined thickness of the layer of silicon nitride is 1000A for a waveguide structure having a width of 3–5 microns.

12. A method according to claim 5, wherein the predetermined thickness of the layer of silicon nitride is 1000A for a waveguide structure having a width of 3–5 microns.

13. A method according to claim 6, wherein the predetermined thickness of the layer of silicon nitride is 1000A for a waveguide structure having a width of 3–5 microns.

14. A structure according to claim 7, wherein the predetermined thickness of the layer of silicon nitride is 1000A for a waveguide structure having a width of 3–5 microns.

15. An evanescent coupler structure comprising first and second silicon rib waveguides each comprising an elongated silicon rib element having an upper silicon face and two side silicon faces and a layer of silicon nitride directly abutting said upper silicon face and side silicon faces and having a predetermined thickness selected to control birefringence in the evanescent coupler.

16. A method according to claim 1, wherein the blanket layer of silicon nitride extends over the substrate flanks on either side of the rib waveguide structure.

17. A method according to claim 2, wherein the blanket layer of silicon nitride extends over the substrate flanks on either side of the rib waveguide structure.

18. A method according to claim 3, wherein the blanket layer of silicon nitride extends over the substrate flanks on either side of the rib waveguide structure.

19. A use according to claim 4, wherein the blanket layer of silicon nitride extends over the substrate flanks on either side of the rib waveguide structure.

20. A method according to claim 5, wherein the blanket layer of silicon nitride extends over the substrate flanks on either side of the rib waveguide structure.

21. A method according to claim 6, wherein the blanket layer of silicon nitride extends over the substrate flanks on either side of the rib waveguide structure.

22. A structure according to claim 7, wherein the blanket layer of silicon nitride extends over the substrate flanks on either side of the rib waveguide structure.

23. A structure according to claim 14, wherein the blanket layer of the silicon nitride extends over the substrate flanks on either side of the rib waveguide structure.

24. A structure according to claim 15, wherein the blanket layer of silicon nitride extends over the substrate flanks on either side of the rib waveguide structure.

25. A method according to claim 1 wherein the waveguide structure is manufactured in a silicon-on-insulator wafer.

26. A method according to claim 2 wherein the waveguide structure is manufactured in a silicon-on-insulator wafer.

27. A method according to claim 3 wherein the waveguide structure is manufactured in a silicon-on-insulator wafer.

28. A use according to claim 4 wherein the waveguide structure is manufactured in a silicon-on-insulator wafer.

29. A method according to claim 5 wherein the waveguide structure is manufactured in a silicon-on-insulator wafer.

30. A method according to claim 6 wherein the waveguide structure is manufactured in a silicon-on-insulator wafer.

31. A structure according to claim 7 wherein the waveguide structure is manufactured on a silicon-on-insulator wafer.

32. A structure according to claim 15 wherein the waveguide structure is manufactured in a silicon-on-insulator wafer.

* * * * *